United States Patent
Yao

(10) Patent No.: US 9,778,791 B2
(45) Date of Patent: Oct. 3, 2017

(54) TOUCH DISPLAY PANEL AND TOUCH DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventor: Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 197 days.

(21) Appl. No.: 14/863,183

(22) Filed: Sep. 23, 2015

(65) Prior Publication Data

US 2016/0291790 A1    Oct. 6, 2016

(30) Foreign Application Priority Data

Apr. 1, 2015  (CN) .......................... 2015 1 0153183

(51) Int. Cl.
*G06F 3/041*    (2006.01)
*G06F 3/044*    (2006.01)

(52) U.S. Cl.
CPC ............ *G06F 3/0418* (2013.01); *G06F 3/044* (2013.01); *G06F 3/0412* (2013.01); *G06F 2203/04111* (2013.01)

(58) Field of Classification Search
CPC ...... G06F 3/041; G06F 3/0412; G06F 3/0416; G06F 3/0418; G06F 3/044; G06F 2203/04103; G06F 2203/04111; G06F 2203/04112
See application file for complete search history.

(56) References Cited

U.S. PATENT DOCUMENTS

2010/0001973 A1* 1/2010 Hotelling .............. G06F 3/0412
                                                                 345/174
2010/0265206 A1* 10/2010 Chen ..................... G06F 3/0412
                                                                 345/174
(Continued)

FOREIGN PATENT DOCUMENTS

CN            104022172 A         3/2014

*Primary Examiner* — Nathan Danielsen
(74) *Attorney, Agent, or Firm* — Alston & Bird LLP

(57) ABSTRACT

In general, embodiments of the present invention provide systems and methods for a touch display panel and a touch display device including a touch display panel. The touch display panel includes: a substrate, and a common electrode layer located on the substrate. The common electrode layer includes multiple touch electrodes insulated from each other. Each of the touch electrodes is electrically connected to a driving circuit via one touch lead. The touch electrodes and the touch leads are located in the same layer. A part of the touch electrodes are divided into multiple sub-electrodes by touch leads adjacent to the divided touch electrodes. The sub-electrodes of each of the touch electrodes are electrically connected to each other via at least one bridge which is located in a different layer from the touch electrode, to reduce parasitic capacitances between the touch leads and the touch electrodes and alleviate an influence from the parasitic capacitances on touch performance.

18 Claims, 4 Drawing Sheets

(56) References Cited

U.S. PATENT DOCUMENTS

2012/0218199 A1* 8/2012 Kim ................... G06F 3/0412
345/173
2012/0313881 A1* 12/2012 Ge .................... G06F 3/0412
345/174

* cited by examiner

TOUCH DISPLAY PANEL AND TOUCH DISPLAY DEVICE

CROSS REFERENCE TO RELATED APPLICATIONS

The present application claims the priority to Chinese Patent Application No. 201510153183.5, entitled "TOUCH DISPLAY PANEL AND TOUCH DISPLAY DEVICE", filed on Apr. 1, 2015 with the State Intellectual Property Office of the PRC, which is incorporated herein by reference in its entirety.

FIELD OF THE INVENTION

The disclosure relates to the field of touch technology, and, in particular, to a touch display panel and a touch display device.

BACKGROUND OF THE INVENTION

According to the conventional embedded touch display technology, a common electrode layer of a display panel generally doubles as touch electrodes. The common electrode layer is generally divided into multiple touch electrodes, and each of the touch electrodes is electrically connected to a driving circuit IC via a touch lead located in a different layer from the common electrode layer.

The above arrangement may result in partial overlappings between the touch leads and the touch electrodes and parasitic capacitances. Therefore, interferences among the touch electrodes may be caused, and touch performance of an embedded self-capacitive touch screen may be affected.

BRIEF SUMMARY OF THE INVENTION

In view of the above, a touch display panel and a touch display device are provided according to the present disclosure, to solve the problem in the conventional art that touch performance of an embedded self-capacitive touch screen is affected due to parasitic capacitances between touch leads and other touch electrodes.

The following technical solutions are provided in the present disclosure.

A touch display panel is provided, which includes: a substrate, and a common electrode layer located on the substrate. The common electrode layer includes multiple touch electrodes insulated from each other; each of the multiple touch electrodes is electrically connected to a driving circuit via one touch lead. The touch electrodes and the touch leads are located in the same layer. A part of the touch electrodes are divided into multiple sub-electrodes by touch leads adjacent to the divided touch electrodes. The sub-electrodes of each of the touch electrodes are electrically connected to each other via at least one bridge which is located in a different layer from the touch electrode.

A touch display device is provided, which includes the touch display panel described above.

In the touch display panel and the touch display device provided by the present disclosure, the common electrode layer includes multiple touch electrodes insulated from each other; each of the touch electrodes is electrically connected to a driving circuit via one touch lead; the touch electrodes and the touch leads are located in the same layer; a part of the touch electrodes are divided into multiple sub-electrodes by touch leads adjacent to the divided touch electrodes; and the sub-electrodes of each of the touch electrodes are electrically connected to each other via at least one bridge which is located in a different layer from the touch electrode. Hence, parasitic capacitances between the touch leads and the touch electrodes are reduced and an influence from the parasitic capacitances on touch performance is alleviated.

BRIEF DESCRIPTION OF THE DRAWINGS

In order to illustrate technical solutions in embodiments of the present disclosure or the conventional art more clearly, drawings to be used in the description of the embodiments or the conventional art are described briefly hereinafter. Apparently, the drawings in the following description are only for some embodiments of the present application. For those skilled in the art, other drawings may also be obtained based on the provided drawings without any creative work.

DETAILED DESCRIPTION OF THE INVENTION

Technical solutions according to embodiments of the present disclosure are hereinafter described clearly and completely in conjunction with the drawings of the embodiments of the present disclosure. Apparently, the described embodiments are only some of the embodiments of the present application but not all the embodiments. Any other embodiments obtained by those skilled in the art based on the embodiments of the present disclosure without any creative work fall within the scope of protection of the present disclosure.

Figure 1:
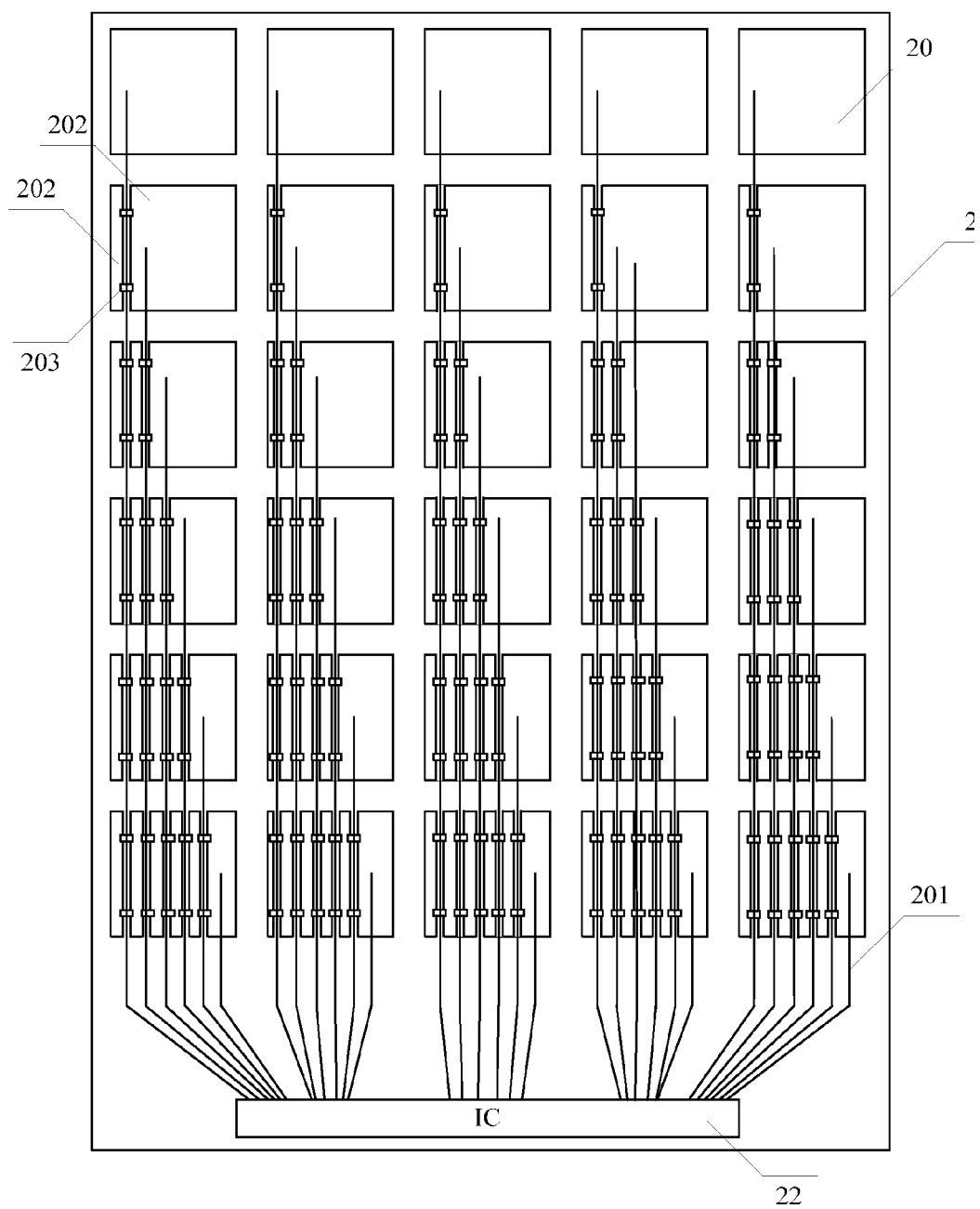
FIG. 1 is a schematic structural diagram of a touch display panel according to an embodiment of the disclosure.

As shown in FIG. 1, a touch display panel 2 is provided according to a first embodiment of the disclosure. The touch display panel 2 includes: a substrate (not shown in FIG. 1), a common electrode layer located above the substrate and an insulating layer located between the substrate and the common electrode layer. The common electrode layer includes multiple touch electrodes 20 insulated from each other. Each of the touch electrodes 20 is electrically connected to a driving circuit IC 22 via one touch lead 201. The touch electrodes 20 and the touch leads 201 are located in the same layer. For a part of the multiple touch electrodes 20, each touch electrode 20 is divided into multiple sub-electrodes 202, and one touch lead 201 is located between any two adjacent sub-electrodes of the touch electrode. The sub-electrodes 202 in each of the touch electrodes 20 are electrically connected to each other via at least one bridge 203 located in a different layer from the touch electrode 20.

The insulating layer includes multiple via holes, and each bridge 203 is electrically connected to corresponding sub-electrodes through the via holes. Moreover, the number of the bridges 203 between adjacent sub-electrodes 202 in each of the touch electrodes 20 is not limited. In the embodiment, two bridges 203 are provided between adjacent sub-electrodes 202 in each of the touch electrodes 20.

Figure 2:
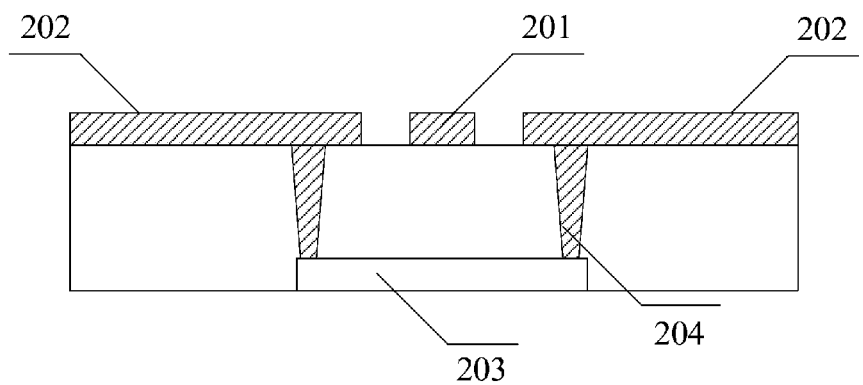
FIG. 2 is a schematic sectional view of a touch electrode, a touch lead and a bridge according to an embodiment of the disclosure.

Reference is further made to FIG. 2, which is a sectional diagram showing a position relationship among the touch electrode 20, the touch lead 201 and the bridge 203. The touch lead 201 is located between two adjacent sub-electrodes 202 of one touch electrode 20, and the touch lead 201 is insulated from the sub-electrodes 202. The bridge 203 and the touch electrode 20 are located in different layers, and the bridge 203 is electrically connected to corresponding sub-electrodes 202 through via holes 204. A parasitic capacitance between the touch lead 201 and the touch electrode 20 may be reduced, since an overlapping area between the touch lead 201 and the touch electrode 20 is reduced.

Further, for each touch electrode 20 provided with the bridges 203, a bridge may be further provided at a position where no bridge 203 is located, that is, a bridge is further provided below a region of the touch electrode other than an opening of the touch electrode 20, to improve display uniformity with the arrangement of the further provided bridge. The further provided bridge may be located in the same layer with the bridges 203, or may be located in a different layer from the bridges 203, which is not limited in the present disclosure. Moreover, the number of the further provided bridge within one touch electrode 20 is not limited. In addition, the further provided bridge may be electrically connected to a corresponding sub-electrode 202 through a via hole.

Figure 3:
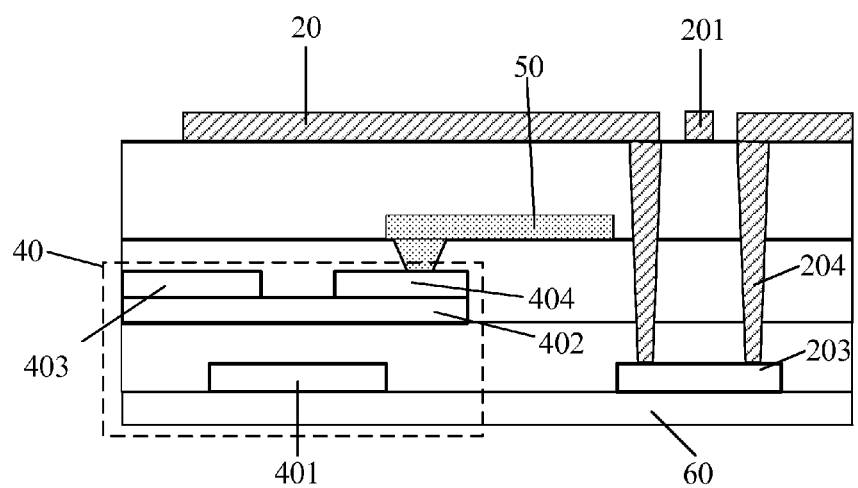
FIG. 3 is a schematic sectional structural diagram of a touch display panel according to an embodiment of the disclosure.
Figure 4:
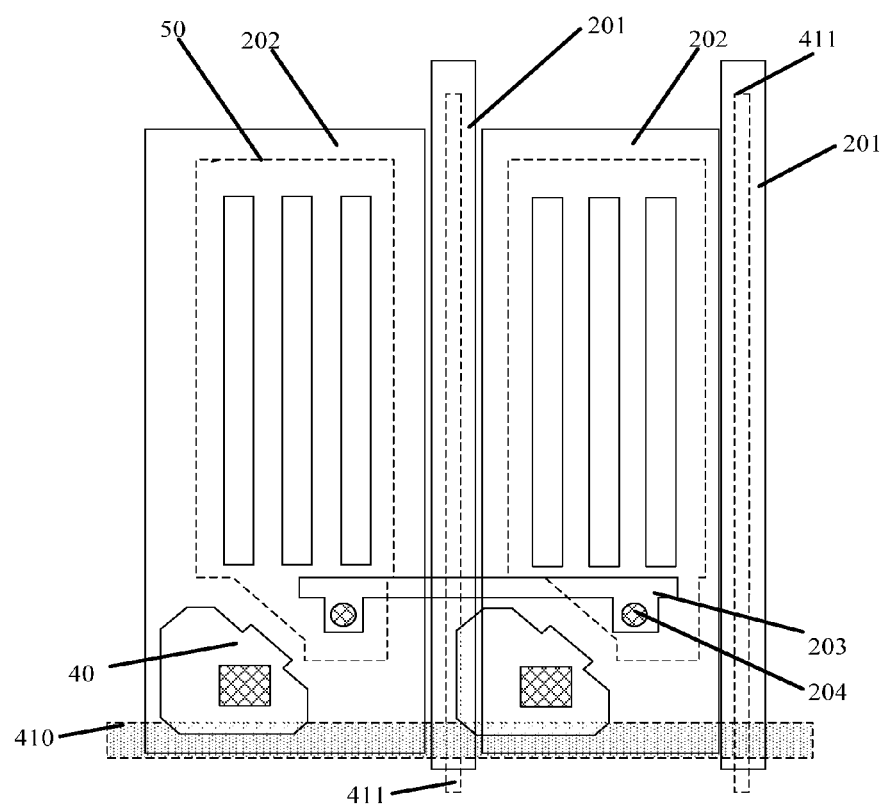
FIG. 4 is a schematic top view of a touch display panel according to an embodiment of the disclosure.

As shown in FIGS. 3 and 4, the touch display panel 2 in the embodiment further includes multiple thin film transistors 40. The thin film transistor 40 includes: a gate 401, a semiconductor layer 402 located above the gate 401, and a source 403 and a drain 404 located on a surface of the semiconductor layer 402. The gate 401 of the thin film transistor 40 is electrically connected to a gate line 410 to receive a scan signal; the source 403 is electrically connected to a data line 411 to receive a data signal; and the drain 404 is electrically connected to a pixel electrode 50. After the thin film transistor 40 is turned on under control of the scan signal, the data signal is transmitted to the pixel electrode 50 via the source 403 and the drain 404, to provide a display voltage for a pixel unit.

In the embodiment, the common electrode layer 20 is located above surfaces of the pixel electrode 50 and the thin film transistor 40, that is, the pixel electrode 50 is located between a substrate 60 and the common electrode layer 20. In this case, the bridge 203 may be located in the same layer with the gate 401 of the thin film transistor 40, or may be located in the same layer with the data line 411, or may be located in a single layer. In the embodiment, preferably, the bridge 203 and the gate 401 are located in the same layer to increase a distance between the touch lead 201 and the bridge 203, thereby reducing a parasitic capacitance between the touch lead 201 and the touch electrode, i.e., the common electrode layer 20. Practically, the present disclosure is not limited thereto, and in other embodiments, the bridge 203 may be located in a different layer from the gate 401. For example, the bridge 203 may be located in the same layer with the source 403 or the drain 404 of the thin film transistor 40.

In the touch display panel according to the embodiment, the common electrode layer includes multiple touch electrodes insulated from each other, and each of the touch electrodes is electrically connected to a driving circuit via one touch lead; the touch electrodes and the touch leads are located in the same layer; for a part of the touch electrodes, each touch electrode is divided into multiple sub-electrodes, where one touch lead is located between any two adjacent sub-electrodes of the touch electrode; and the sub-electrodes in each of the touch electrodes are electrically connected to each other via at least one bridge located in a different layer from the touch electrode. Hence, parasitic capacitances between the touch leads and the touch electrodes are reduced and an influence from the parasitic capacitances on touch performance is alleviated.

A touch display panel is provided according to a second embodiment of the present disclosure. Similarly, the touch display panel includes: a substrate (not shown in FIG. 4), a common electrode layer located above the substrate, and an insulating layer located between the substrate and the common electrode layer. The common electrode layer includes multiple touch electrodes 20 insulated from each other. Each of the touch electrodes 20 is electrically connected to a driving circuit IC 22 via one touch lead 201. The touch electrodes 20 and the touch leads 201 are located in the same layer. For a part of the touch electrodes 20, each touch electrode is divided into multiple sub-electrodes 202, where one touch lead 201 is located between any two adjacent sub-electrodes of the touch electrode 20. The sub-electrodes 202 in each of the touch electrodes 20 are electrically connected to each other via at least one bridge 203 located in a different layer from the touch electrode 20. The number of the bridge 203 between adjacent sub-electrodes 202 in each of the touch electrodes 20 is not limited. In the embodiment, two bridges 203 are arranged between adjacent sub-electrodes 202 in each of the touch electrodes 20.

Figure 5:
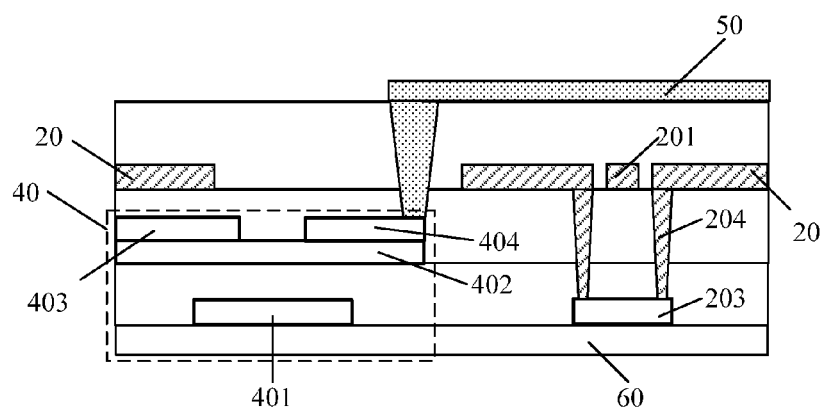
FIG. 5 is a schematic sectional structural diagram of an touch display panel according to an embodiment of the disclosure.

The touch display panel in the embodiment differs from the touch display panel in the above embodiment in that, as shown in FIG. 5, the common electrode layer 20 in the embodiment is located between the substrate 60 and the pixel electrode 50, that is, the common electrode layer 20 in the embodiment is located above a surface of the thin film transistor 40, the pixel electrode 50 is located above a surface of the common electrode layer 20, and an insulating layer is located between the pixel electrode 50 and the common electrode layer 20. In this case, the bridge 203 may be located in the same layer with the gate 401 of the thin film transistor 40, or may be located in the same layer with the data line 411, or may be located in a single layer. In the embodiment, preferably, the bridge 203 is located in the same layer with the gate 401, to increase a distance between the touch lead 201 and the bridge 203, thereby reducing a parasitic capacitance between the touch lead 201 and the bridge 203.

With the touch display panel according to the embodiment, the common electrode layer includes multiple touch electrodes insulated from each other, and each of the touch electrodes is electrically connected to a driving circuit via one touch lead; the touch electrodes and the touch leads are located in the same layer; for a part of the touch electrodes, each touch electrode is divided into multiple sub-electrodes, where one touch lead is located between any two adjacent sub-electrodes of the touch electrode; and the sub-electrodes in each of the touch electrodes are electrically connected to each other via at least one bridge located in a different layer from the touch electrode. Hence, parasitic capacitances between the touch leads and the touch electrodes are reduced and an influence from the parasitic capacitances on touch performance is alleviated.

A touch display panel is provided according to a third embodiment of the present disclosure. The touch display panel in the embodiment differs from the touch display panel in the above embodiments in that, the touch display panel in the embodiment further includes a common electrode wire 205 electrically connected to the common electrode layer 20. The common electrode wire 205 is located in the same layer with the gate 401 of the thin film transistor 40 and is electrically connected to the common electrode layer 20 through a via hole 206, to reduce a resistance of the common electrode layer 20.

Figure 6:
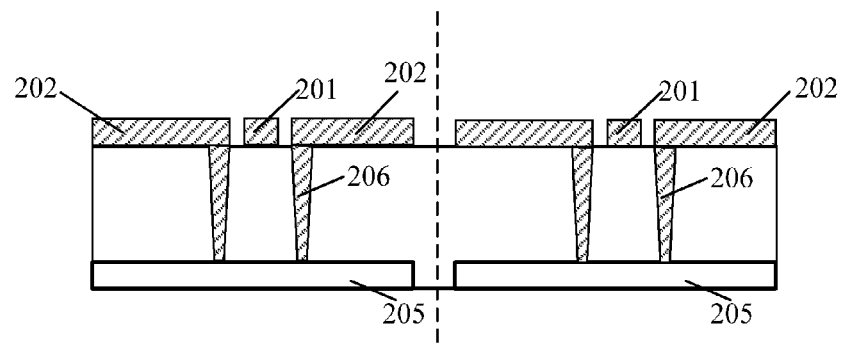
FIG. 6 is a schematic sectional view of a touch electrode, a touch lead and a common electrode wire according to an embodiment of the disclosure.
Figure 7:
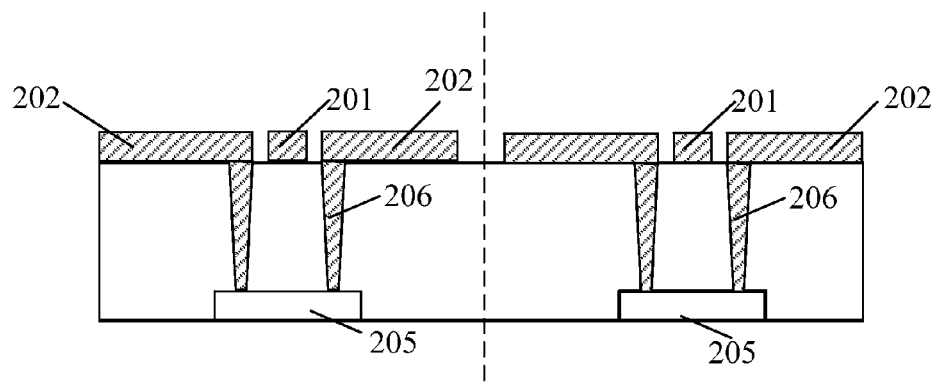
FIG. 7 is a schematic sectional view of a touch electrode, a touch lead and a common electrode wire according to an embodiment of the disclosure.

In view of the above, in the embodiment, the common electrode wire 205 may function as the bridge to electrically connect the sub-electrodes 202 in each of the touch electrodes. As shown in FIG. 6, the common electrode wire 205 is electrically connected to the sub-electrodes 202 in one touch electrode through the via holes 206, and the common electrode wire 205 is disconnected in a marginal region of the touch electrode, that is, the common electrode wire 205 between the touch electrodes is disconnected. Alternatively, as shown in FIG. 7, the common electrode 205 may be connected to the sub-electrodes 202 in one touch electrode in a form of the bridge.

With the touch display panel according to the embodiment, the common electrode layer includes multiple touch electrodes insulated from each other, and each of the touch electrodes is electrically connected to a driving circuit via one touch lead; the touch electrodes and the touch leads are located in the same layer; for a part of the touch electrodes, each touch electrode is divided into multiple sub-electrodes, where one touch lead is located between any two adjacent sub-electrodes of the touch electrode; and the sub-electrodes in each of the touch electrodes are electrically connected to each other via at least one bridge located in a different layer from the touch electrode. Hence, parasitic capacitances between the touch leads and the touch electrodes are reduced and an influence from the parasitic capacitances on touch performance is alleviated.

A touch display panel is provided according to a fourth embodiment of the present disclosure. The touch display panel in the embodiment differs from the touch display panel in the above embodiments in that, the common electrode layer in the above embodiments is located on an array substrate, while a common electrode layer in the embodiment is located on a color film substrate, and a liquid crystal layer is further located between the color film substrate and the array substrate.

In the embodiment, the touch leads and the common electrode layer are located in the same layer. The bridges may be located in a single layer above or below the common electrode layer, or may be located in the same layer with any of other conducting layers on the color film substrate. Moreover, the bridge is electrically connected to the sub-electrodes in the same touch electrode through the via holes. In the embodiment, the touch leads and the common electrode layer are located in the same layer, and the bridges and the common electrode layer are located in different layers, such that a distance between the touch lead and the bridge is increased, thereby reducing a parasitic capacitance between the touch lead and the bridge.

With the touch display panel according to the embodiment, the common electrode layer includes multiple touch electrodes insulated from each other, and each of the touch electrodes is electrically connected to a driving circuit via one touch lead; the touch electrodes and the touch leads are located in the same layer; for a part of the touch electrodes, each touch electrode is divided into multiple sub-electrodes, where one touch lead is located between any two adjacent sub-electrodes of the touch electrode; and the sub-electrodes in each of the touch electrodes are electrically connected to each other via at least one bridge located in a different layer from the touch electrode. Hence, parasitic capacitances between the touch leads and the touch electrodes are reduced and an influence from the parasitic capacitances on touch performance is alleviated.

A touch display device is provided according to a fifth embodiment of the present disclosure. The touch display device includes the touch display panel according to any one of the above embodiments. A parasitic capacitance between the touch lead and its adjacent touch electrode of the touch display panel is small, and accordingly, the touch performance is good.

The embodiments of the specification are described in a progressive manner, with the emphasis of each of the embodiments on the difference from the other embodiments; hence, for the same or similar parts between the embodiments, one embodiment can be understood with reference to the other embodiments. The description of the embodiments herein enables those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure may not be limited to the embodiments described herein, but is in accordance with the widest scope consistent with the principles and novel features disclosed herein.

What is claimed is:

1. A touch display panel, comprising:
   a substrate, and a common electrode layer located on the substrate;
   wherein the common electrode layer comprises a plurality of touch electrodes insulated from each other;
   each of the plurality of touch electrodes is electrically connected to a driving circuit via one touch lead;
   the touch electrodes and the touch leads are located in the same layer;
   a part of the plurality of touch electrodes are divided into a plurality of sub-electrodes by touch leads adjacent to the divided touch electrodes; and
   the sub-electrodes of each divided touch electrode are electrically connected to each other via at least one bridge, the at least one bridge being located in a different layer from the divided touch electrode.

2. The touch display panel of claim 1, further comprising an insulating layer located between the substrate and the common electrode layer, wherein the insulating layer comprises a plurality of via holes, and the at least one bridge is electrically connected to corresponding sub-electrodes through the via holes.

3. The touch display panel of claim 2, wherein the touch display panel comprises a plurality of pixel units, each of the plurality of pixel units comprises a thin film transistor, and the at least one bridge is located in the same layer with a gate of the thin film transistor.

4. The touch display panel of claim 3, further comprising a pixel electrode located between the substrate and the common electrode layer.

5. The touch display panel of claim 3, further comprising a pixel electrode, wherein the common electrode layer is located between the substrate and the pixel electrode.

6. The touch display panel of claim 2, further comprising a common electrode wire electrically connected to the touch electrodes, and the at least one bridge is formed by the common electrode wire.

7. The touch display panel of claim 6, wherein the touch display panel comprises a plurality of pixel units, each of the plurality of pixel units comprises a thin film transistor, and the common electrode wire is located in the same layer with a gate of the thin film transistor.

8. The touch display panel of claim 7, wherein the common electrode wire is electrically connected to corresponding sub-electrodes through the via holes, and the common electrode wire is disconnected at a position between adjacent touch electrodes.

9. The touch display panel of claim 6, further comprising a pixel electrode located between the substrate and the common electrode layer.

10. The touch display panel of claim 8, further comprising a pixel electrode, wherein the common electrode layer is located between the substrate and the pixel electrode.

11. The touch display panel of claim 7, wherein the common electrode wire is connected to the sub-electrodes in a form of bridges.

12. The touch display panel of claim 11, further comprising a pixel electrode located between the substrate and the common electrode layer.

13. The touch display panel of claim 11, further comprising a pixel electrode, wherein the common electrode layer is located between the substrate and the pixel electrode.

14. The touch display panel of claim 2, wherein the touch display panel comprises a plurality of pixel units, each pixel unit comprises a thin film transistor, and the bridge is located in the same layer with a source or a drain of the thin film transistor.

15. A touch display device, comprising
a touch display panel;
wherein the touch display panel comprises a substrate, and a common electrode layer located on the substrate;
wherein the common electrode layer comprises a plurality of touch electrodes insulated from each other;
each of the plurality of touch electrodes is electrically connected to a driving circuit via one touch lead;
the touch electrodes and the touch leads are located in the same layer;
a part of the plurality of touch electrodes are divided into a plurality of sub-electrodes by touch leads adjacent to the divided touch electrodes; and
the sub-electrodes of each divided touch electrode are electrically connected to each other via at least one bridge, the at least one bridge being located in a different layer from the divided touch electrode.

16. The touch display device of claim 15, wherein the touch display panel further comprises an insulating layer located between the substrate and the common electrode layer, wherein the insulating layer comprises a plurality of via holes, and the at least one bridge is electrically connected to corresponding sub-electrodes through the plurality of via holes.

17. The touch display device of claim 16, wherein the touch display panel comprises a plurality of pixel units, each of the plurality of pixel units comprises a thin film transistor, and the at least one bridge is located in the same layer with a gate of the thin film transistor.

18. The touch display device of claim 16, the touch display panel further comprising a common electrode wire electrically connected to the touch electrodes, and the at least one bridge is formed by the common electrode wire.

* * * * *

UNITED STATES PATENT AND TRADEMARK OFFICE
CERTIFICATE OF CORRECTION

PATENT NO. : 9,778,791 B2  
APPLICATION NO. : 14/863183  
DATED : October 3, 2017  
INVENTOR(S) : Qijun Yao Page 1 of 1

It is certified that error appears in the above-identified patent and that said Letters Patent is hereby corrected as shown below:

In the Claims

Column 7, Line 15, Claim 9, --claim 6-- should read --claim 8--

Signed and Sealed this  
Eighth Day of May, 2018

Andrei Iancu  
*Director of the United States Patent and Trademark Office*